(12) United States Patent
Fulton et al.

(10) Patent No.: US 10,120,783 B2
(45) Date of Patent: *Nov. 6, 2018

(54) DETERMINING TEST CASE EFFICIENCY

(71) Applicant: International Business Machines Corporation, Armonk, NY (US)

(72) Inventors: Michael S. Fulton, Squamish (CA); John R. MacMillan, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,990

(22) Filed: May 1, 2017

(65) Prior Publication Data
US 2017/0262358 A1    Sep. 14, 2017

Related U.S. Application Data

(63) Continuation of application No. 14/602,738, filed on Jan. 22, 2015, now Pat. No. 9,703,690.

(51) Int. Cl.
*G06F 9/44* (2018.01)
*G06F 9/45* (2006.01)
*G06F 11/36* (2006.01)

(52) U.S. Cl.
CPC ...... *G06F 11/3676* (2013.01); *G06F 11/3688* (2013.01); *G06F 11/3692* (2013.01); *G06F 11/3664* (2013.01)

(58) Field of Classification Search
CPC ............ G06F 11/3673; G06F 11/3688; G06F 11/3692; G06F 11/3664; G06F 11/3676
See application file for complete search history.

(56) References Cited

U.S. PATENT DOCUMENTS

| 5,805,795 | A | 9/1998 | Whitten |
| 8,266,592 | B2 * | 9/2012 | Beto ............... G06F 11/3688 717/124 |
| 8,276,123 | B1 | 9/2012 | Deng et al. |

(Continued)

FOREIGN PATENT DOCUMENTS

| CN | 102880545 A | 1/2013 |
| CN | 193455423 A | 12/2013 |
| CN | 103713994 A | 4/2014 |

OTHER PUBLICATIONS

Tilo Mucke, Minimizing Test Execution Time During Test Generation, pp. 1-13, 2006 (Year: 2006).*

(Continued)

*Primary Examiner* — Mongbao Nguyen
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and system is provided for determining test case efficiency. In an implementation, a method may include determining each code unit executed by a test case in a test suite including a plurality of test cases, wherein a product-under-test includes a plurality of code units. The method may also include determining an execution time for the test case. The method may further include calculating an efficiency rating of the test case based upon, at least in part, a number of code units executed by the test case and the execution time for the test case.

15 Claims, 7 Drawing Sheets

(56) References Cited

U.S. PATENT DOCUMENTS

| | | | | |
|---|---|---|---|---|
| 8,375,364 B2* | 2/2013 | Udupa | ............... | G06F 11/3696 714/38.1 |
| 8,387,018 B2* | 2/2013 | Artzi | ............... | G06F 11/3688 714/38.1 |
| 8,448,144 B2* | 5/2013 | Rossi | ............... | G06F 11/3688 717/126 |
| 8,667,255 B2* | 3/2014 | Alapati | ............... | G06F 11/2236 712/227 |
| 8,799,868 B2 | 8/2014 | Ndem et al. | | |
| 9,032,370 B2* | 5/2015 | Chakraborty | ....... | G06F 11/3672 714/809 |
| 9,367,435 B2* | 6/2016 | Sinyagin | ............ | G06F 11/3684 |
| 9,454,467 B2* | 9/2016 | Wu | ............... | G06F 11/3684 |
| 9,489,290 B1* | 11/2016 | Boissy | ............ | G06F 11/3688 |
| 9,529,700 B2* | 12/2016 | Raghavan | ............ | G06F 11/3688 |
| 9,632,916 B2* | 4/2017 | Alexander | ......... | G06F 11/3676 |
| 2006/0070048 A1 | 3/2006 | Li et al. | | |
| 2008/0010543 A1* | 1/2008 | Yamamoto | ............ | G06F 11/3688 714/38.1 |
| 2008/0082968 A1 | 4/2008 | Chang et al. | | |
| 2008/0092120 A1* | 4/2008 | Udupa | ............... | G06F 11/3696 717/124 |
| 2008/0120602 A1 | 5/2008 | Comstock et al. | | |
| 2008/0256517 A1 | 10/2008 | Atkin et al. | | |
| 2009/0070746 A1* | 3/2009 | Dhurjati | ............ | G06F 11/3676 717/128 |
| 2009/0265681 A1 | 10/2009 | Beto et al. | | |
| 2009/0265693 A1 | 10/2009 | Bakowski | | |
| 2010/0153924 A1 | 6/2010 | Andrews | | |
| 2010/0287534 A1 | 11/2010 | Vangala et al. | | |
| 2011/0161936 A1 | 6/2011 | Huang et al. | | |
| 2012/0084538 A1* | 4/2012 | Alapati | ............... | G06F 11/2236 712/227 |
| 2012/0233596 A1 | 9/2012 | Adler et al. | | |
| 2013/0111267 A1 | 5/2013 | Beryoza et al. | | |
| 2013/0174178 A1 | 7/2013 | Chakraborty et al. | | |
| 2014/0109052 A1 | 4/2014 | Tempel et al. | | |
| 2014/0331204 A1 | 11/2014 | Godefroid | | |
| 2014/0380277 A1 | 12/2014 | Bhagavatula | | |
| 2014/0380279 A1 | 12/2014 | Bartley et al. | | |
| 2015/0007138 A1* | 1/2015 | Sabetta | ............... | G06F 11/3684 717/124 |
| 2015/0007140 A1 | 1/2015 | Boshernitsan et al. | | |
| 2015/0067648 A1* | 3/2015 | Sivanesan | ............ | G06F 11/3684 717/124 |
| 2015/0169432 A1 | 6/2015 | Sinyagin et al. | | |
| 2015/0363296 A1 | 12/2015 | Lee et al. | | |
| 2015/0378877 A1 | 12/2015 | Bhattacharya | | |
| 2015/0378879 A1 | 12/2015 | Ding | | |
| 2016/0034375 A1 | 2/2016 | Sinha et al. | | |
| 2016/0077956 A1 | 3/2016 | Bhattacharya et al. | | |
| 2016/0162392 A1* | 6/2016 | Hu | ............... | G06F 11/3684 714/38.1 |

OTHER PUBLICATIONS

Bo Jiang, Bypassing code coverage approximation limitations via effective input-based randomized test case prioritization, pp. 190-198, 2013. https://ieeexplore.ieee.org/stamp/stamp.jsp?tp=&arnumber=6649820 (Year: 2013).*

Dusica Marijan, Test Case Prioritzation for Continous Regression Testing: An Industrial Case Study, pp. 540-543, 2013. https://ieeexplore.ieee.org/stamp/stamp.jsp?tp=&arnumber=6676952 (Year: 2013).*

Kavitha Rajarathinam, Test suite prioritisation using trace events technique, 2011, pp. 85-92, 2011. https://ieeexplore.ieee.org/stamp/stamp.jsp?arnumber=6519507 (Year: 2011).*

Chen Zhang, An Improved Regression Test Selection Technique by Clustering Execution profiles, pp. 171-179, 2010. https://ieeexplore.ieee.org/stamp/stamp.jsp?tp=&arnumber=5562956 (Year: 2010).*

Horvath et al., "Code coverage Measurement Framework for Android Devices," Acta Cybernetica 21 (2014), pp. 439-458.

Hans-Gerhard Gross, "An Evaluation of Dynamic, Optimisation-based Worst-case Execution Time Analysis," Fraunhofer Institute Experimental Software Engineer, Germany, Proceedings of the International Conference on Information Technology: Prospects and Challenges in the 21st Century, Kathmandu, Nepal, May 23-26, 2003, pp. 1-7.

Wasif Afzal, "Metrics in Software Test Planning and Test Design Processes," Master Thesis, Software Engineering Thesis No. MSE-2007:02, Jan. 2007, pp. 1-105.

Xu et al., "Test Suite Reduction Using Weighted Set Covering Techniques," 2012 13th ACIS International Conference on Software Engineering, Artificial Intelligence, Networking and Parallel/Distributed Computing, 2012 IEEE, pp. 307-312.

Fraser et al., "Whole Test Suite Generation," IEEE Transactions on Software Engineering, vol. 39, No. 2, Feb. 2013., pp. 276-291.

* cited by examiner

DETERMINING TEST CASE EFFICIENCY

RELATED APPLICATIONS

The subject application is a continuation application of U.S. patent application Ser. No. 14/602,738, filed on Jan. 22, 2015, the entire contents of which are herein incorporated by reference.

TECHNICAL FIELD

The present disclosure generally relates to testing software, and more particularly relates to determining test case efficiency.

BACKGROUND

Testing software during a development cycle may be challenging. The larger the software package, the more individual source and/or executable modules to be tested, the more challenging the problem may become. Thousands of tests may be run. Over time, the set of tests, referred to as a test suite, may grow as new tests are added. It may difficult to determine which tests in the test suite are the most effective and efficient to test the software, and which tests may be redundant.

SUMMARY OF DISCLOSURE

According to an implementation, a computer-implemented method may include determining each code unit executed by a test case in a test suite including a plurality of test cases, wherein a product-under-test includes a plurality of code units. The method may also include determining, by the processor, an execution time for the test case. The method may further include calculating an efficiency rating of the test case based upon, at least in part, a number of code units executed by the test case and the execution time for the test case.

One or more of the following features may be included. The method may further include determining a number of times each of the plurality of code units is executed in the test suite. The method may also include generating a code unit distribution model based upon, at least in part, the number of times each of the plurality of code units is executed in the test suite.

The method may further include generating an execution model of the test suite based upon, at least in part, the efficiency rating of the test case. The method may also include defining an order of execution of the plurality of test cases based upon, at least in part, the execution model. The method may further include executing a subset of the test suite based upon, at least in part, the execution model.

The method may also include determining a sanity rating for each of the plurality of test cases based upon, at least in part, the number of code units executed by the test case and the execution time for the test case.

According to another implementation, a computer program product includes a computer readable medium having a plurality of instructions stored on it. When executed by a processor, the instructions may cause the processor to perform operations including determining each code unit executed by a test case in a test suite including a plurality of test cases, wherein a product-under-test includes a plurality of code units. Instructions may also be included for determining an execution time for the test case. Instructions may also be included for calculating an efficiency rating of the test case based upon, at least in part, a number of code units executed by the test case and the execution time for the test case.

One or more of the following features may be included. Instructions may be included for determining a number of times each of the plurality of code units is executed in the test suite. Instructions may further be included for generating a code unit distribution model based upon, at least in part, the number of times each of the plurality of code units is executed in the test suite.

Instructions may be included for generating an execution model of the test suite based upon, at least in part, the efficiency rating of the test case. Instruction may also be included for defining an order of execution of the plurality of test cases based upon, at least in part, the execution model. Instructions may further be included for executing a subset of the test suite based upon, at least in part, the execution model.

Instructions may also be included for determining a sanity rating for each of the plurality of test cases based upon, at least in part, the number of code units executed by the test case and the execution time for the test case.

According to another implementation, a system may include at least one processor device and at least one memory architecture coupled with the at least one processor device. The at least one processor device may be configured for determining each code unit executed by a test case in a test suite including a plurality of test cases, wherein a product-under-test includes a plurality of code units. The at least one processor may also be configured for determining an execution time for the test case. The at least one processor may further be configured for calculating an efficiency rating of the test case based upon, at least in part, a number of code units executed by the test case and the execution time for the test case.

One or more of the following features may be included. The at least one processor may further be configured for determining a number of times each of the plurality of code units is executed in the test suite. The at least one processor may also be configured for generating a code unit distribution model based upon, at least in part, the number of times each of the plurality of code units is executed in the test suite.

The at least one processor may further be configured for generating an execution model of the test suite based upon, at least in part, the efficiency rating of the test case. The at least one processor may also be configured for defining an order of execution of the plurality of test cases based upon, at least in part, the execution model. The at least one processor may also be configured for executing a subset of the test suite based upon, at least in part, the execution model.

The at least one processor may further be configured for determining a sanity rating for each of the plurality of test cases based upon, at least in part, the number of code units executed by the test case and the execution time for the test case.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
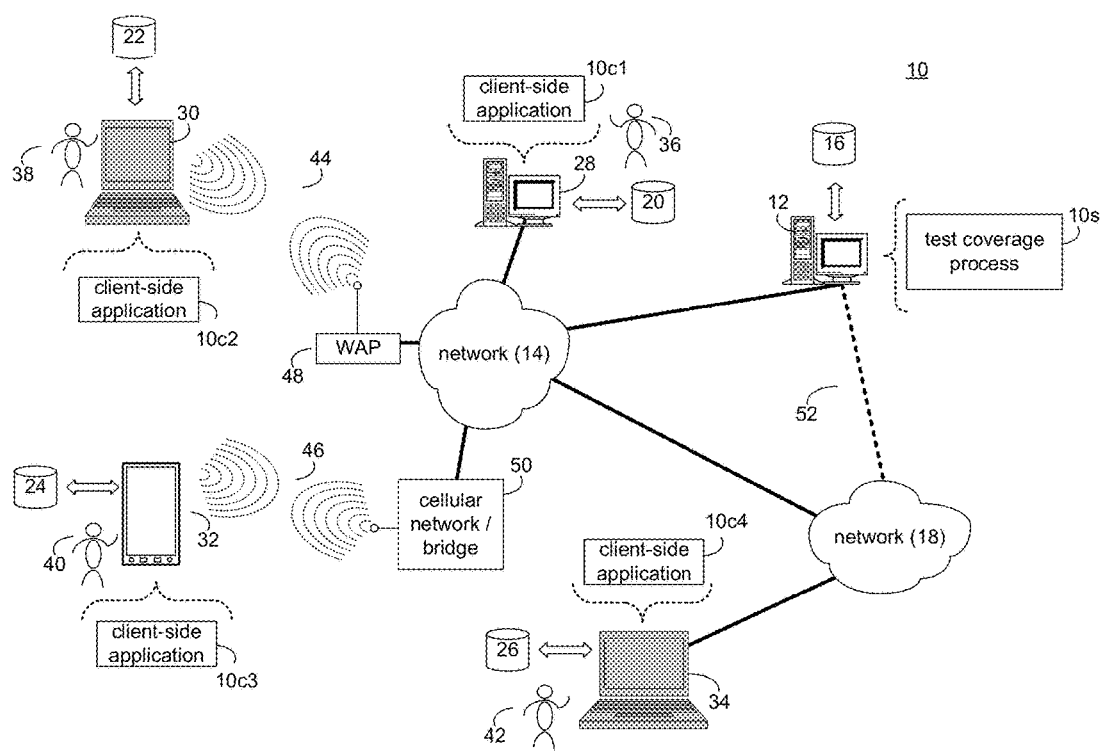
FIG. 1 is a diagrammatic view of a distributed computing network including a computing device that executes a test coverage process according to an implementation of the present disclosure.

Referring to FIG. 1, there is shown test coverage process 10. For the following discussion, it is intended to be understood that test coverage process 10 may be implemented in a variety of ways. For example, test coverage process 10 may be implemented as a server-side process, a client-side process, or a server-side/client-side process.

For example, test coverage process 10 may be implemented as a purely server-side process via test coverage process 10s. Alternatively, test coverage process 10 may be implemented as a purely client-side process via one or more of client-side application 10c1, client-side application 10c2, client-side application 10c3, and client-side application 10c4. Alternatively still, test coverage process 10 may be implemented as a server-side/client-side process via test coverage process 10s in combination with one or more of client-side application 10c1, client-side application 10c2, client-side application 10c3, and client-side application 10c4. In such an example, at least a portion of the functionality of test coverage process 10 may be performed by test coverage process 10s and at least a portion of the functionality of test coverage process 10 may be performed by one or more of client-side application 10c1, 10c2, 10c3, and 10c4.

Accordingly, test coverage process 10 as used in this disclosure may include any combination of test coverage process 10s, client-side application 10c1, client-side application 10c2, client-side application 10c3, and client-side application 10c4.

Figure 2:
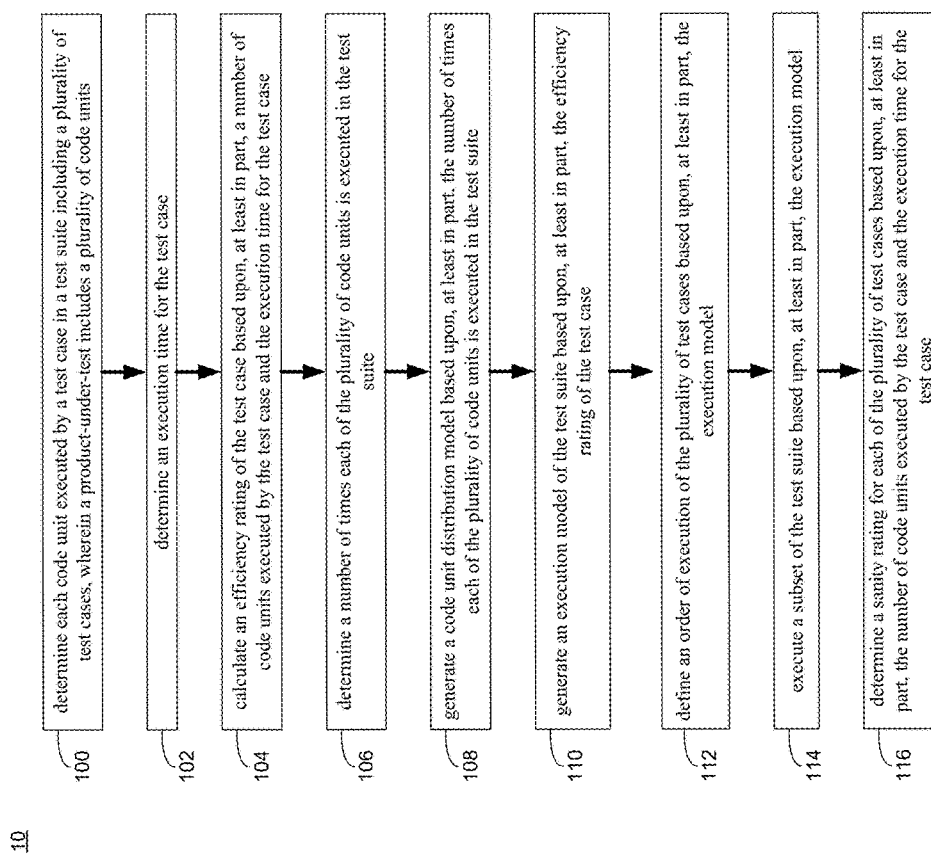
FIG. 2 is a flowchart of the test coverage process of FIG. 1, according to an implementation of the present disclosure.

Referring also to FIG. 2, and as will be discussed in greater detail below, test coverage process 10 may determine 100 each code unit executed by a test case in a test suite including a plurality of test cases, wherein a product-under-test includes a plurality of code units. Test coverage process 10 may also determine 102 an execution time for the test case. Test coverage process 10 may also calculate 104 an efficiency rating of the test case based upon, at least in part, a number of code units executed by the test case and the execution time for the test case.

Test coverage process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of test coverage process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access test coverage process 10 directly through network 14 or through secondary network 18. Further, test coverage process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

As generally discussed above with reference to FIG. 2, test coverage process 10 may determine 100 each code unit executed by a test case in a test suite including a plurality of test cases, wherein a product-under-test includes a plurality of code units. Test coverage process 10 may also determine 102 an execution time for the test case. Test coverage process 10 may also calculate 104 an efficiency rating of the test case based upon, at least in part, a number of code units executed by the test case and the execution time for the test case.

Test coverage process 10 may determine 100 each code unit executed by a test case in a test suite including a plurality of test cases, wherein a product-under-test includes a plurality of code units. Test coverage process 10 may further determine 102 an execution time for the test case. A test suite may include a plurality of test cases. The test suite may be used to test a product-under-test. The product-under-test may include, for example, a software application, a software module, a suite of software modules, and/or any collection of software applications or portions of a software application, or even a single line of code. The product under test may be tested by the test case, e.g., to identify defects (e.g., bugs), such as operational failures and security vulnerabilities. A plurality of test cases may together provide a test suite, which may test various different aspects of the product under test and/or may test aspects of the product under test in differing manners and/or to differing degrees. The different aspects of the product under test that are tested by the test suite (and/or individual test cases within the test suite) may include, for example, different portions (e.g., code portions, functional portions, etc.), different attributes (e.g., identification of defects, identification of operation failures, identification of security vulnerability), function testing, etc. The product-under-test may be tested by at least a subset of the plurality of test cases included in the test suite. The product-under-test may include a plurality of code units. A general-purpose code coverage tool may run a test case in code coverage mode to produce raw data describing what code in the product-under-test is executed by the test case. This may be done by the following algorithm:

For each test case $T_i$ in a test suite $T_{0 \ldots M}$:
  extract each set of classes that are executed in the product-under-test
  sort the extracted set of classes by class name ($C_{0 \ldots N}$, such that a particular class associated with a particular test case may be referenced as $C_{ij}$, for class j associated with test case i)
  record an execution (run) time that the test case took to run ($R_i$)

While the code unit included in the above algorithm has been described in terms of classes executed, the algorithm may not be limited to classes executed. For example, a code unit included within a product-under-test may include, but are not limited to, classes, compilation units, basic blocks, statements, etc. As described above, test coverage process 10 may determine 100 each code unit (e.g., each set of classes) of the product under test that is executed by test case $T_i$ in test suite $T_{0 \ldots M}$. Each code unit (e.g., each set of classes) may be sorted by code unit name $C_{0 \ldots N}$. Test coverage process 10 may also determine 102 and record an execution time for test case Tito run. The execution time may be the total time it took for the test case to run from start to finish. The execution time may be recorded in a data store including but not limited to, a data file, a database, etc.

In an embodiment, test coverage process 10 may determine 106 a number of times each of the plurality of code units of the product under test is executed in the test suite. As discussed above, the product-under-test may include a plurality of code units. Continuing with the algorithm above, test coverage process 10 may determine 106 the number of times each of the plurality of code units is executed in test suite $T_{0 \ldots M}$ with the following algorithm:
 compile a complete list of each test case ($T_i$) that executed each class
 sort the results by class name ($C_{0 \ldots N}$)
 iterate through the sorted class name array
 count how many times each class name occurs
 create a named map entry M, with the key being the class name and the value being the class name execution count As described above, test coverage process 10 may determine 106 the number of times each of the plurality of code units (e.g., classes, as described in the above algorithm) may be executed in test suite $T_{0 \ldots M}$ through a named look-up table such that $M_{class-name}$ may return the number of test cases that execute class-name.

The algorithm described above is provided for exemplary purposes only. The algorithm is not intended to be a limitation of this disclosure, as other algorithms may be possible. For example, any algorithm that may determine the number of times each of the plurality of code units is executed and create a named map entry may be substituted for the algorithm above.

Figure 3:
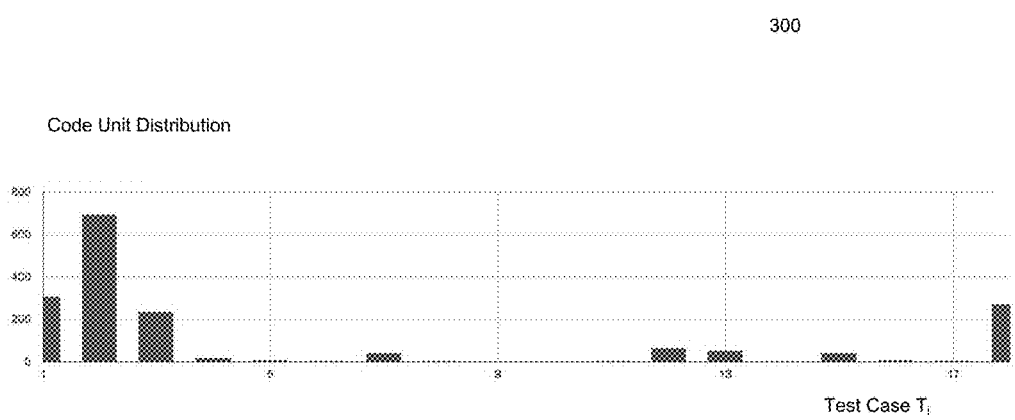
FIG. 3 diagrammatically depicts an implementation of the test coverage process of FIG. 1, according to an example embodiment.

Test coverage process 10 may generate 108 a code unit distribution model based upon, at least in part, the number of times each of the plurality of code units is executed in the test suite. Referring to FIG. 3, test coverage process may generate 108 distribution model 300 to display how many times each of the plurality of code units (e.g., classes) may be executed in test suite $T_{0 \ldots M}$. This data, from a test case overlap perspective, may be used to communicate the overall "quality" of the test suite to a test suite owner or developer. The quality of the test suite may be based on, at least in part, one or more of a degree of coverage (e.g., percentage of code units covered) and a degree of overlap in code units covered by the various test cases of the test suite. For example, FIG. 3 includes 18 test cases on the x-axis and up to 800 code units on the y-axis. As shown in FIG. 3, a majority of the plurality of code units may be tested in one, two or three test cases, indicating that the overlap of test cases is reasonably low. Distribution model 300 also includes a small number of exceptions, indicating that those test cases may be worthwhile to further investigate as to why the small number of exceptions exist and are out of line with the other test cases. Further time may be spent inspecting the exceptions as they relate to the product-under-test in order to improve efficiency of the overall test suite. Note that distribution model 300 includes at least one of the plurality of code units executed by each test case. This may indicate infrastructure code units (e.g., classes) used by a test harness. These test cases may be excluded to provide a more refined definition of code unit distribution. While a bar graph is shown in FIG. 3, this is for exemplary purposes only. The distribution model may be any visual display including, but not limited to, a model, graph, chart, etc.

Test coverage process 10 may further calculate 104 an efficiency rating of the test case based upon, at least in part, a number of code units executed by the test case and the execution time for the test case. Test coverage process 10 may calculate 104 the efficiency rating ($E_i$) of the test case ($T_i$) with the following algorithm:
 set velocity ($V_i$) to 0
 for each class executed by test case $T_i$, increment $V_i$ by the reciprocal of the number of times that class is executed in test suite $T_{0 \ldots M}$
 set $E_i$ to $V_i/R_i$ As described in the above algorithm, test coverage process 10 may assign an initial velocity ($V_i$) to zero (0). For each code unit executed by test case $T_i$, velocity $V_i$ may be incremented by the reciprocal of the number of times that the code unit is executed by test suite $T_{0 \ldots M}$. For example, velocity $V_i$ may be incremented by one-fifth (⅕) if five (5) test cases in the test suite execute that particular code unit. In another example, velocity $V_i$ may be incremented by 1/1 if one (1) test case in the test suite executes that particular code unit. Efficiency rating $E_i$ may then be calculated 104 by dividing velocity $V_i$ by the execution time $R_i$ (as calculated above) for the test case to run. If a test case executes many code units quickly, and the code units are only tested in one particular test case, then it may have a relatively high efficiency rating. If a test case executes a few common code units and takes a long time to run, it may have a relatively low efficiency rating.

Figure 4:
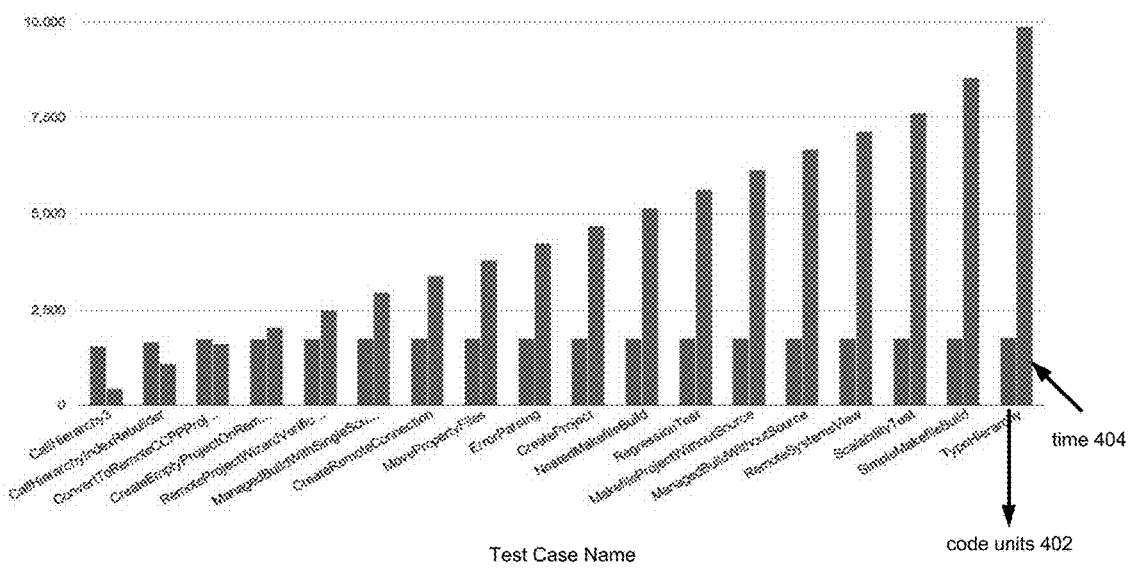
FIG. 4 diagrammatically depicts an implementation of the test coverage process of FIG. 1, according to an example embodiment.

As shown in FIG. 4, test coverage process 10 may generate 110 an execution model of the test suite based upon, at least in part, the efficiency rating of the test case. Test coverage process 10 may generate 110 execution model 400 to visually display the efficiency rating for each of the plurality of test cases included in the test suite. Test coverage process 10 may order each test case from highest efficiency rating to lowing efficiency rating, producing execution model 400 to display each of the plurality of test cases included within the test suite that may cover the most code for the product-under-test the fastest. If one test case executes many code units quickly, that test case may have a relatively high efficiency rating. If one test case executes a small number of code units slowly, that test case may have a relatively low efficiency rating. Execution model 400 may include each test case name in the test suite on the x-axis and the efficiency rating on the y-axis. For each test case included within execution model 400, a bar graph may be generated for the number of code units 402 executed by that particular test case and the execution time 404 for that particular test case to run. While a bar graph is shown in FIG. 4, this is for exemplary purposes only. The execution model may be any visual display including, but not limited to, a model, graph, chart, etc.

For example, as shown in FIG. 4, 1552 of the 1775 code units may be tested by the very first test case (e.g., CallHierarchy3). After 3 test cases, that number rises to 1738 code units. The total time to execute the first 3 test cases is 455 seconds after the first test case (e.g., CallHierarchy3), 1613 seconds after the first 3 tests cases, and 9871 seconds after the full 18 test cases are run. By running the 3 highest efficiency test cases, test coverage process 10 may cover 1738/1775 (97.9%) of the code units in the product-under-test in 1613/9871 (16%) of the time.

In an embodiment, test coverage process 10 may define 112 an order of execution of the plurality of test cases based upon, at least in part, the execution model. Test coverage process 10 may further execute 114 a subset of the test suite based upon, at least in part, the execution model. By graphing the results above, test coverage process 10 may run a subset of test cases of the original test suite with the ability to assess how many code units (e.g., classes) may not be tested and how much time could be saved running the subset of test cases. As such, the product-under-test may be tested in a relatively efficient way and the code most commonly tested may be tested earliest as a way to quickly determine the quality of a version of the product-under-test.

Figure 5:
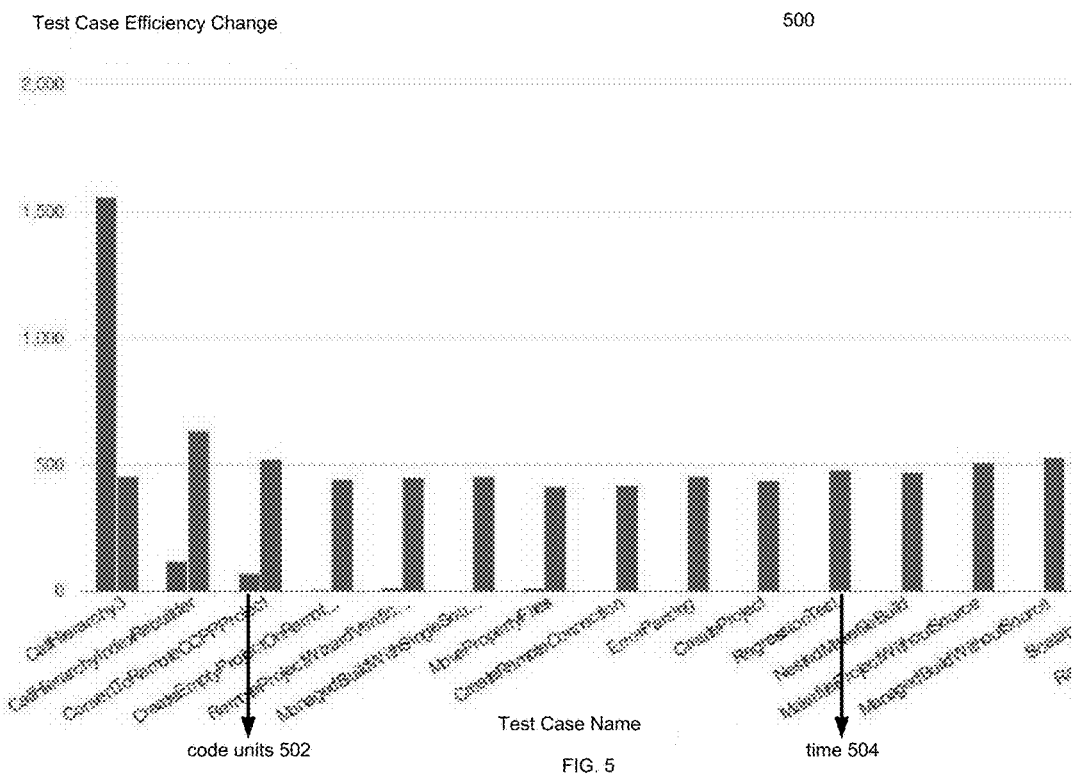
FIG. 5 diagrammatically depicts an implementation of the test coverage process of FIG. 1, according to an example embodiment.

FIG. 5 includes another example view of the efficiency data above. FIG. 5 highlights the diminishing returns of running additional test cases beyond the three highest efficiency test cases from FIG. 4. FIG. 5 shows the additional code units 502 tested by each subsequent test case and how much time 504 it may take to add each test case.

Test coverage process 10 may further determine 116 a sanity rating for each of the plurality of test cases based upon, at least in part, the number of code units executed by the test case and the execution time for the test case. The sanity rating may, for example, provide an indication of the number of code units tested per unit time by a given test case. Test coverage process 10 may calculate which test cases exercise common code units. This may be useful for determining whether a large number of test cases may fail because a particular piece of product-under-test code may be faulty. This measurement may be referred to as a sanity rating. Test coverage process 10 may determine 116 the sanity rating ($S_i$) of the test case ($T_i$) with the following algorithm:

set velocity ($V_i$) to 0
    for each class executed by test case $T_i$, increment $V_i$ by the
       number of times that class is executed in test suite
       $T_{0 \ldots M}$
    set $S_i$ to $V_i/R_i$ As described in the above algorithm, test coverage process 10 may assign an initial velocity ($V_i$) to zero (0). For each code unit (e.g., class) executed by test case $T_i$, velocity $V_i$ may be incremented by the number of times that the code unit is executed by test suite $T_{0 \ldots M}$ (note that to calculate the efficiency rating ($E_i$) above, velocity ($V_i$) was incremented by the reciprocal of the number of times that class was executed in test suite $T_{0 \ldots M}$). For example, velocity $V_i$ may be incremented by five (5) if five (5) test cases in the test suite execute that particular code unit. In another example, velocity $V_i$ may be incremented by one (1) if one (1) test case in the test suite executes that particular code unit. This may be repeated for each of the plurality of code units. Sanity rating $S_i$ may then be calculated by dividing velocity $V_i$ by the execution time $R_i$ (as calculated above) for the test case to run. If a test case executes many code units quickly, and the code units are only tested in one particular test case, then it may have a very high sanity rating. If a test case executes a few distinct code units and takes a long time to run, it may have a very low sanity rating.

Figure 6:
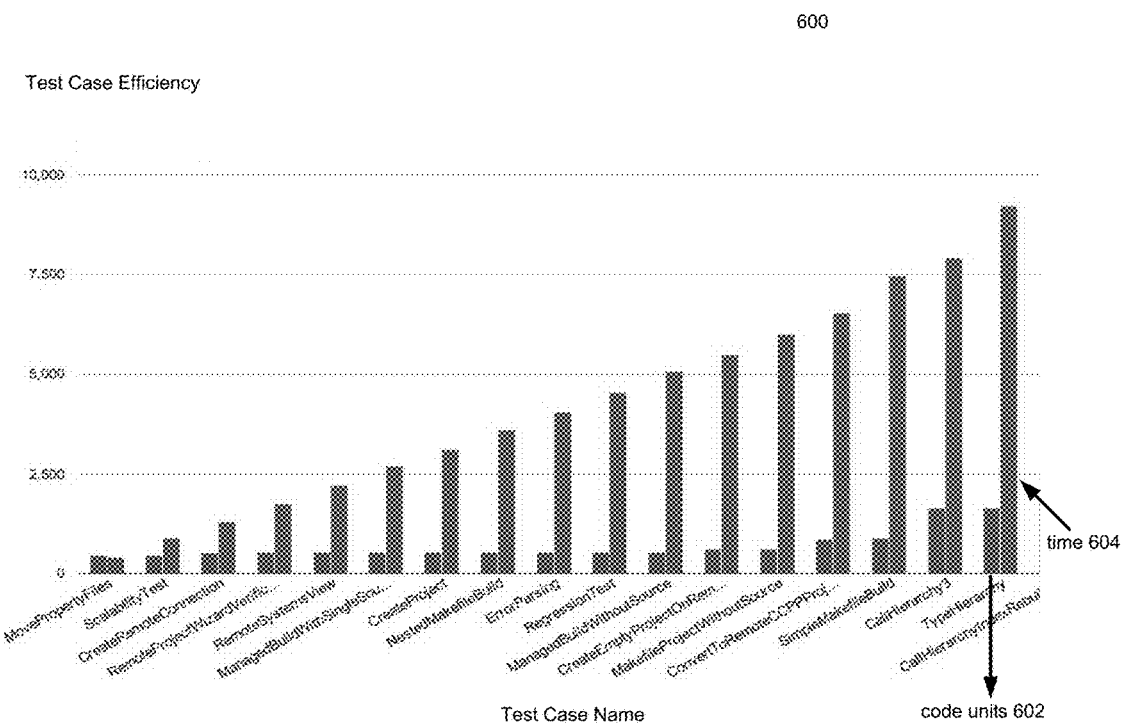
FIG. 6 diagrammatically depicts an implementation of the test coverage process of FIG. 1, according to an example embodiment.

Referring to FIG. 6, test coverage process 10 may generate a sanity model of the test suite based upon, at least in part, the sanity rating of the test case. Test coverage process 10 may generate sanity model 600 to visually display the sanity rating for each of the plurality of test cases included in the test suite. Test coverage process 10 may order each test case from highest sanity rating to lowing sanity rating, producing sanity model 600 to display each of the plurality of test cases included within the test suite that may cover the most code for the product-under-test the fastest. If one test case executes many code units quickly, that test case may have a high sanity rating. If one test case executes a small number of code units slowly, that test case may have a low sanity rating. Sanity model 600 may include each test case name in the test suite on the x-axis and the efficiency rating on the y-axis. For each test case included within sanity model 600, a bar graph may be generated for the number of code units 602 executed by that particular test case and the execution time 602 for that particular test case to run. While a bar graph is shown in FIG. 6, this is for exemplary purposes only. The sanity model may be any visual display including, but not limited to, a model, graph, chart, etc.

For example, FIG. 6 provides a visual display of which test cases may be run to test very common paths of code units very quickly. As shown in FIG. 6, test coverage process 10 may determine 116 a high sanity rating by running a single test case (e.g., MovePropertyFiles) to cover 458 common code units (e.g., classes) in 415 seconds.

Test coverage process 10 may calculate 104 the efficiency rating of each test case for various reasons. For example, test coverage process 10 may calculate 104 the efficiency rating of each test case to define 112 an order of execution of the plurality of test cases such that code for the product-under-test may be tested in the most effective and efficient way. Further, test coverage process 10 may calculate 104 the efficiency rating of each test case to define 112 an order of execution of the plurality of test cases such that the most commonly tested code for the product-under-test is tested sooner rather than later as a means to quickly determine the quality of the version of the product-under-test. Test coverage process 10 may also calculate 104 the efficiency rating of each test case to understand an overall "quality" of the test suite by analyzing the distribution of code tested across the plurality of test cases included within the test suite.

Figure 7:
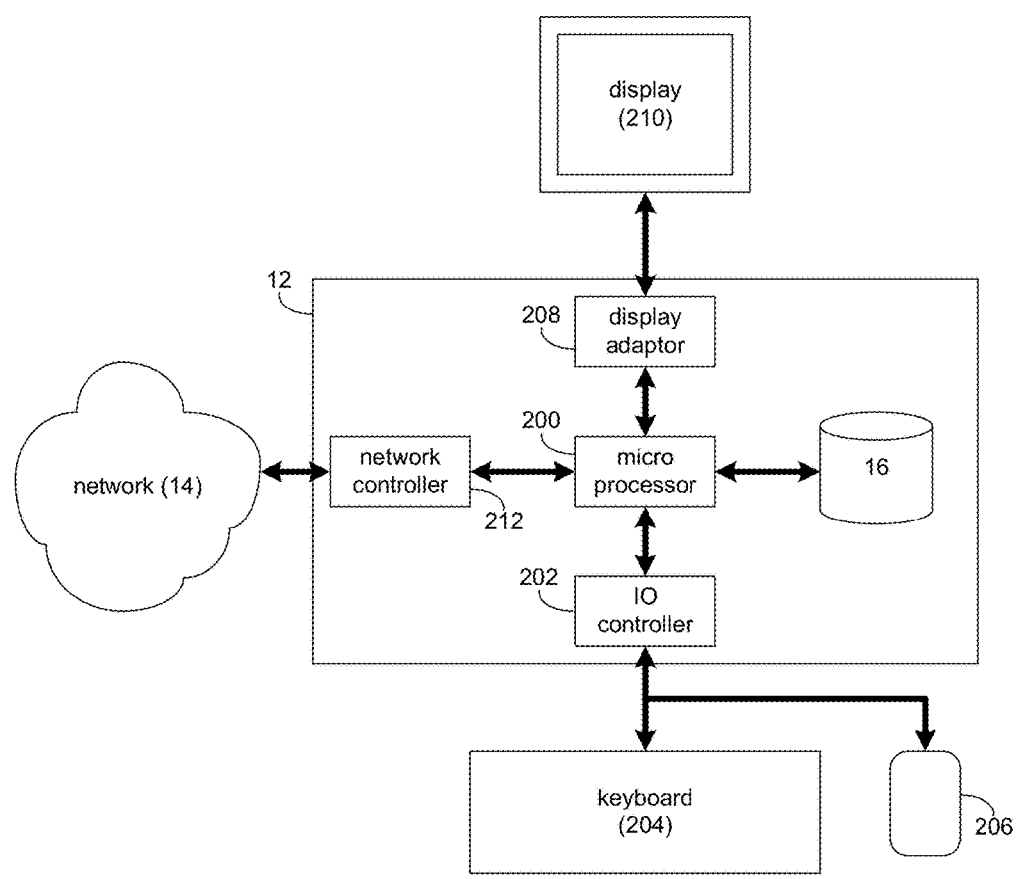
FIG. 7 is a diagrammatic view of the computing device of FIG. 1, according to an implementation of the present disclosure.

Referring also to FIG. 7, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, test coverage process 10 may be substituted for computing device 12 within FIG. 7, examples of which may include but are not limited to client electronic devices 28, 30, 32, 34.

Computing system 12 may include microprocessor 200 configured to e.g., process data and execute instructions/code for test coverage process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. 10 controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
determining, by a processor, each code unit executed by a test case in a test suite including a plurality of test cases based upon, at least in part, running the test case on a product-under-test in a code coverage mode, wherein the product-under-test includes a plurality of code units;
determining, by the processor, a number of times each of the plurality of code units is executed in the test suite;
determining, by the processor, an execution time for the test case;
determining a sanity rating for each of the plurality of test cases based upon, at least in part, a number of code units executed by the test case and the execution time for the test case;
generating a sanity model of the test suite based upon at least in part, the sanity rating of the plurality of test cases, wherein generating a sanity model includes displaying the sanity rating for each of the plurality of test cases included in the test suite; and
calculating, by the processor, an efficiency rating of the test case based upon, at least in part, an increment, for each code unit executed by the test case, of a reciprocal of the number of times each code unit is executed by the test suite and the execution time for the test case.

2. The computer-implemented method of claim 1, further including:
generating a code unit distribution model based upon, at least in part, the number of times each of the plurality of code units is executed in the test suite.

3. The computer-implemented method of claim 1, further including:
generating an execution model of the test suite based upon, at least in part, the efficiency rating of the test case.

4. The computer-implemented method of claim 3, further including:
defining an order of execution of the plurality of test cases based upon, at least in part, the execution model.

5. The computer-implemented method of claim 3,
further including:
executing a subset of the test suite based upon, at least in part, the execution model.

6. A computer program product comprising a non-transitory computer readable medium having a plurality of instructions stored thereon, which, when executed by a processor, cause the processor to perform operations including:
determining each code unit executed by a test case in a test suite including a plurality of test cases based upon, at least in part, running the test case on a product-under-test in a code coverage mode, wherein the product-under-test includes a plurality of code units;
determining a number of times each of the plurality of code units is executed in the test suite;
determining an execution time for the test case;
determining a sanity rating for each of the plurality of test cases based upon, at least in part, a number of code units executed by the test case and the execution time for the test case;
generating a sanity model of the test suite based upon at least in part, the sanity rating of the plurality of test cases, wherein generating a sanity model includes displaying the sanity rating for each of the plurality of test cases included in the test suite; and calculating an efficiency rating of the test case based upon, at least in part, an increment, for each code unit executed by the test case, of a reciprocal of the number of times each code unit is executed by the test suite and the execution time for the test case.

7. The computer program product of claim 6, further including:
generating a code unit distribution model based upon, at least in part, the number of times each of the plurality of code units is executed in the test suite.

8. The computer program product of claim 6, further including:
generating an execution model of the test suite based upon, at least in part, the efficiency rating of the test case.

9. The computer program product of claim 8, further including:
defining an order of execution of the plurality of test cases based upon, at least in part, the execution model.

10. The computer program product of claim 8, further including:
executing a subset of the test suite based upon, at least in part, the execution model.

11. A system comprising:
at least one processor device and at least one memory architecture coupled with the at least one processor device, the at least one processor device configured for:
determining each code unit executed by a test case in a test suite including a plurality of test cases based upon, at least in part, running the test case on a product-under-test in a code coverage mode, wherein the product-under-test includes a plurality of code units;
determining a number of times each of the plurality of code units is executed in the test suite;
determining an execution time for the test case;
determining a sanity rating for each of the plurality of test cases based upon, at least in part, a number of code units executed by the test case and the execution time for the test case;
generating a sanity model of the test suite based upon at least in part, the sanity rating of the plurality of test cases, wherein generating a sanity model includes displaying the sanity rating for each of the plurality of test cases included in the test suite; and
calculating an efficiency rating of the test case based upon, at least in part, an increment for each code unit executed by the test case, of a reciprocal of the number of times each code unit is executed by the test suite and the execution time for the test case.

12. The system of claim 11, further including:
generating a code unit distribution model based upon, at least in part, the number of times each of the plurality of code units is executed in the test suite.

13. The system of claim 11, further including:
generating an execution model of the test suite based upon, at least in part, the efficiency rating of the test case.

14. The system of claim 13, further including:
defining an order of execution of the plurality of test cases based upon, at least in part, the execution model.

15. The system of claim 13, further including:
executing a subset of the test suite based upon, at least in part, the execution model.

* * * * *